United States Patent Office 3,364,392
Patented Jan. 16, 1968

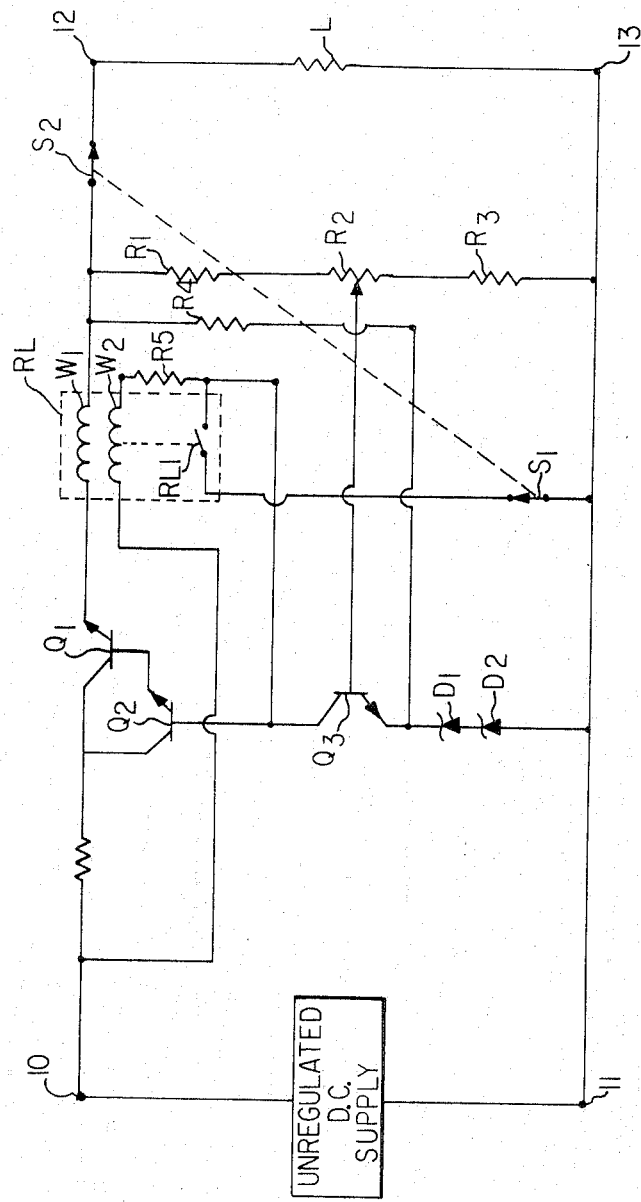

3,364,392
DEVICE FOR PROTECTING VOLTAGE REGULATORS FROM INTERMITTENT AND PROLONGED OVERLOAD CURRENTS
James Lafreniere, Ottawa, Ontario, Canada, assignor to Northern Electric Company Limited, Montreal, Quebec, Canada
Filed Aug. 30, 1965, Ser. No. 483,649
10 Claims. (Cl. 317—33)

ABSTRACT OF THE DISCLOSURE

The invention relates to the protection of regulators having a regulating valve in series with the load against destruction due to both intermittent and prolonged overload currents. The device comprises means responsive to prolonged overload currents for decoupling the regulator from the load, and means responsive to intermittent overload current for feeding back to said regulating valve a current proportional to the intermittent overload current for reducing conduction through the valve. In the embodiment described, the overload protection device is a relay having two electrically coupled windings acting as a current transformer. The primary winding of the relay is connected in series with the load and operates a pair of contacts which decouple the regulator from the load in case of a sustained overload. The second winding of the relay is connected in a negative feedback loop to the regulating valve for reducing conduction therethrough in response to intermittent overload currents.

---

This invention relates to voltage regulator protection devices.

In power supplies used for providing a constant output voltage a regulator is usually connected between the source of primary power supply and a pair of output terminals. Consequently great care must be taken to protect the regulator from destruction due to both intermittent and prolonged overload currents drawn from the primary supply.

Fuses have been used to protect the components of voltage regulators from destruction due to overload. However fuses are relatively slow to burn out and offer no protection against short duration overloads which can be destructive to some of the components of the regulators. This is particularly true with transistorized regulators which may be destroyed by high amplitude short duration overload currents.

Another way of protecting regulators has been to sense the current fed to the load by means of a current sensitive device such as a relay for example and to decouple the regulators from the load when the current therethrough exceeds a predetermined value. However relays do not ensure positive decoupling of the load from the regulators when a short duration high amplitude overload current occurs before permanent damage is done to the regulators.

In accordance with the invention, a protection device for regulators having a regulating valve serially connected with the load is provided which senses the high amplitude current surges of short duration flowing through the regulator and feeds back a signal to the valve to reduce conduction therethrough thereby protecting the regulator.

A suitable sensing device may be a current transformer having a first winding connected in series with the load and a second winding connected in a negative feedback loop to the valve. If short duration high amplitude overload currents occur, such currents are induced in the second winding by the first winding and fed back to the regulating valve. The negative feedback current reduces conduction through the valve and dampens the high amplitude surges in the interval between the beginning of the overload and decoupling of the regulator.

A preferred overload current protection device may be a relay having two electrically coupled windings acting as a current transformer. The first winding of the relay is connected in series with the load and operates a pair of contacts which decouples the regulator from the load in case of a sustained overload. The second winding of the relay is connected in a negative feedback loop to the regulating valve for reducing conduction through the valve thereby protecting the valve against intermittent overload currents.

The invention will now be described with reference to the drawings illustrating a preferred embodiment of the invention.

Referring to the drawing, there is shown a voltage regulator constructed in accordance with the invention. Input terminals 10 and 11 of the regulator are adapted to be connected to an unregulated source of D.C. voltage supply. Output terminals 12 and 13 are adapted to provide a load L with a regulated voltage supply. A regulating valve such as the transistors Q1 and Q2 is connected serially between terminals 10 and 12 and is responsive to a voltage regulation means including a transistor Q3 to maintain the voltage across load L constant when the load current is below a predetermined level.

The collectors of transistors Q1 and Q2 are interconnected and the emitter of transistor Q2 is connected to the base of transistor Q1. Transistors Q1 and Q2 form a compound connected transistor which operates the same as a a single transistor having a high gain.

Resistors $R_1$, $R_2$ and $R_3$ are provided to sample the output voltage across terminals 12 and 13 and to feed back this sample voltage to the series regulating transistors Q1 and Q2. To this end the base of NPN type transistor Q3 is connected to a variable tap on resistor $R_2$. The emitter electrode of transistor Q3 is connected to a junction point between a resistor $R_4$ and Zener diodes D1 and D2 connected across terminals 12 and 13. The Zener diodes D1 and D2 serve to maintain the emitter of the transistor Q3 at a substantially constant voltage with respect to negative output terminal 13. Thus changes in the voltage at the base of the transistor Q3 may be compared to the fixed voltage at the emitter.

The collector of the transistor Q3 is connected to the base of a transistor Q2. A resistor R5 and a winding W2 (the function of which will be described below) are connected in series between terminal 10 and the base of transistor Q2 and apply a bias to the base of transistor Q2 in a forward direction.

The voltage regulating portion of the circuit operates as follows:

If the output voltage between terminals 12 and 13 attempts to rise due to a decrease in load current or an increase in input voltage, this voltage increase is sensed at the tap of resistor R2 increasing the biasing current of Q3 (the emitter potential is maintained constant by Zener diodes $D_1$ and $D_2$). An increase in the biasing current of transistor Q3 will cause an iincrease in collector to emitter current and consequently a decrease of collector voltage. A decrease in collector voltage of transistor Q3 will cause a decrease in base voltage applied to transistor Q2. A drop in base voltage of transistor Q2 will produce a decrease in the emitter current of transistors Q2 and Q1. Consequently the impedance of transistor Q1 will be increased and the output voltage between terminals 12 and 13 will be reduced thereby compensating for the attempted voltage increase across the load.

On the other hand, any tendency for the voltage between terminals 12 and 13 to decrease will cause a decrease of voltage at the base of transistor Q3 and consequently an increase in collector voltage. An increase in collector voltage of transistor Q3 will cause an increase in voltage at the base of transistor Q2 and a resultant increase in emitter current of transistor Q1 which, in turn, will decrease the impedance of regulating transistor Q1. Consequently the output voltage between terminals 12 and 13 will remain constant.

While the negative feedback control circuit described above operates satisfactorily for a wide range of variations in current drawn by the load up to a predetermined level, under overload current conditions, the negative feedback control circuit tends to maintain a constant output voltage and allows increased amount of current to flow through transistor Q1 which leads to destruction of the transistor.

In accordance with the invention an overload protection device is provided for protecting the regulator against both sustained and intermittent overload. The means for protecting the regulator against sustained overload may take various forms but is shown as a relay having a winding $W_1$ in series with transistors Q1 and Q2 which operates a pair of contacts RL1. The operating current of winding $W_1$ of relay RL is chosen at a value slightly higher than the normal current output of the regulator. When the current drawn by the load exceeds the value required to operate the relay, the relay closes contacts RL1 which are connected in series with the base of transistor Q2 and terminal 11 or 13. The potential at the base of transistor Q2 is then lowered to the potential of terminal 11 or 13. This turns off transistors Q1 and Q2 and decouples the load from the regulator thereby protecting the series regulating transistors against destruction due to sustained overload. Relay RL locks itself up through its second winding $W_2$ which is then connected between input terminals 10 and 11.

If a short duration high amplitude overload current occurs however, the regulator requires extra protection because the known protection devices are not generally fast enough to fully protect the transistors Q1 and Q2. To insure full protection, means such as a current transformer is provided for sensing the high amplitude surges. In the drawing, windings $W_1$ and $W_2$ of relay RL act as a current transformer having a turn ratio such that a sudden increase in current in winding $W_1$ will induce a feedback current in winding $W_2$ which will buck the biasing current of transistor Q2 and cause a decrease in base voltage of transistor Q2. A drop in base voltage of transistor Q2 will reduce conduction through transistor Q1 and dampen the high amplitude surges. The power dissipation of the transistor Q1 will thus be reduced during the interval between overload and closing of the relay contacts.

A turn ratio of 1:20 for windings $W_1$ and $W_2$ has given satisfactory results although other values are contemplated.

Resetting of the regulator is accomplished by momentarily opening switches $S_1$ and $S_2$. Opening of switches $S_1$ and $S_2$ releases relay RL. Release of relay RL opens contacts RL1 and resets the regulator back to its original condition.

It is to be understood that the invention herein described is not limited to the use of a relay. A relay is described only as a matter of convenience because it may act as a current interrupting device and a current transformer. In cases where other means are used to decouple the regulator from the load, a current transformer or other means of feeding back the high amplitude overload current surges to the biasing circuit of the regulating transistors may be used.

Although the invention is primarily useful with transistorized regulators, it may also be used with voltage regulators using electron tubes. A description of a voltage regulator using electron tubes may be found on page 1216 of the Radiotron Designer's Handbook by Langford-Smith. With such regulators, winding $W_2$ would be connected in the grid biasing circuit of the regulating tube.

What is claimed is:

1. A voltage regulator protection device comprising:
   (a) an input circuit for connection to an unregulated D.C. voltage supply;
   (b) an output circuit for connection to a load;
   (c) a regulating valve serially connected between said input and output circuits adapted to maintain the voltage across the load substantially constant when the load current is below a predetermined level; and
   (d) overload current protection means including means responsive to sustained load currents above said predetermined level for preventing conduction through the valve, and a current transformer having a primary winding serially connected between said input and output circuits and a secondary winding inductively coupled to the primary winding connected to the valve, said current transformer being responsive to high amplitude overload current surges of short duration flowing through its primary winding for generating a negative feedback current in its secondary winding which reduces conduction through the valve, thereby dampening said surges and protecting the valve against destruction.

2. A voltage regulator as defined in claim 1 wherein said means is a relay operating a pair of normally open contacts connected to said valve, the operation of said relay contacts rendering said valve non-conducting.

3. A voltage regulator as defined in claim 1 wherein said overload protection means comprises a relay having a first winding serially connected between said input and output circuits and a second winding inductively coupled to the first winding and connected in a feedback loop to said valve, said first winding operating a pair of normally open contacts connected to said valve to render the valve non-conducting, said second winding generating a negative feedback current which reduces conduction through said valve in response to high amplitude overload current surges induced therein by said first winding.

4. A voltage regulator as defined in claim 3 wherein the second winding is connected in series with the pair of contacts and maintains the contacts operated once operated by the first winding.

5. A voltage regulator as defined in claim 3 further including a pair of normally closed reset contacts in series with said first and second windings which may be opened manually to reset the regulator back into its original condition.

6. A voltage regulator protection device comprising:
   (a) an input circuit for connection to an unregulated D.C. voltage supply;
   (b) an output circuit for connection to a load;
   (c) a transistor serially connected between said input and output circuits including a circuit for biasing the the transistor into conduction;
   (d) voltage regulation means responsive to variation in the magnitude of the output voltage appearing across the load to variably bias the transistor to maintain the output voltage substantially constant when the current flowing through the load is below a predetermined level; and
   (e) overload current protection means including means responsive to sustained overload currents above said predetermined level for rendering the transistor non-conducting, and a current transformer having a primary winding serially connected between said input and output circuits and a secondary winding inductively coupled to the primary winding connected to the biasing circuit of the transistor, said current transformer being responsive to high amplitude overload current surges of short duration flowing through its primary winding for generating a negative feedback current in its secondary winding which reduces conduction through the transistor thereby dampening said surges and protecting the transistor against destruction.

7. A voltage regulator as defined in claim 6 wherein said means is a relay having an operating winding serially connected between said input and output circuits and a pair of normally open contacts connected to the biasing circuit of the transistor, the operation of the contacts by the relay rendering the transistor non-conducting.

8. A voltage regulator protection device as defined in claim 6 wherein said overload protection means comprises a relay having a first winding serially connected between said input and output circuits and a second winding inductively coupled to the first winding and connected into the biasing circuit of said transistor, said first winding operating a pair of normally open contacts to remove biasing from the transistor and stop conduction therethrough in response to overload current, said second winding inducing a negative feedback current through the biasing circuit of the transistor to reduce conduction therethrough.

9. A voltage regulator protection device as defined in claim 8 wherein the second winding is connected in series with the pair of contacts and maintains the relay contacts operated once operated by the first winding.

10. A voltage regulator as defined in claim 8 further including a pair of normally closed reset contacts in series with said first and second windings which may be opened manually to reset the regulator back into its original condition.

References Cited

UNITED STATES PATENTS

| | | | |
|---|---|---|---|
| 3,177,402 | 4/1965 | Muchnick et al. | 317—33 |
| 3,218,542 | 11/1965 | Taylor. | |
| 3,327,167 | 6/1967 | Schaefer | 317—31 |
| 3,299,321 | 1/1967 | Damon | 317—16 |

MILTON O. HIRSHFIELD, *Primary Examiner.*

R. V. LUPO, *Assistant Examiner.*